US008768552B2

(12) United States Patent
Krueger et al.

(10) Patent No.: US 8,768,552 B2
(45) Date of Patent: Jul. 1, 2014

(54) VEHICLE BRAKE SYSTEM AND METHOD OF OPERATING THE SAME

(75) Inventors: Eric E. Krueger, Chelsea, MI (US); Michael C. Roberts, Auburn Hills, MI (US); Kevin S. Kidston, New Hudson, MI (US); Paul A. Kilmurray, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 13/528,961

(22) Filed: Jun. 21, 2012

(65) Prior Publication Data

US 2013/0345913 A1    Dec. 26, 2013

(51) Int. Cl.
*B60T 8/17* (2006.01)
*B60T 8/32* (2006.01)

(52) U.S. Cl.
CPC ..... *B60T 8/17* (2013.01); *B60T 8/32* (2013.01)
USPC ................. 701/22; 701/48; 701/70; 701/76; 701/79; 303/152

(58) Field of Classification Search
CPC ..................................... B60T 8/17; B60T 8/32
USPC ............... 701/22, 48, 70, 76, 79; 303/152
See application file for complete search history.

(56) References Cited

U.S. PATENT DOCUMENTS

| 6,813,553 | B2 * | 11/2004 | Nakamura et al. | 701/70 |
|---|---|---|---|---|
| 7,136,737 | B2 * | 11/2006 | Ashizawa et al. | 701/70 |
| 7,988,243 | B2 * | 8/2011 | Miyazaki et al. | 303/155 |
| 8,388,071 | B2 * | 3/2013 | Yokoyama et al. | 303/152 |
| 2003/0080614 | A1 * | 5/2003 | Soga | 303/152 |
| 2004/0054450 | A1 * | 3/2004 | Nakamura et al. | 701/22 |
| 2004/0122579 | A1 * | 6/2004 | Ashizawa et al. | 701/70 |
| 2007/0210647 | A1 * | 9/2007 | Miyazaki et al. | 303/155 |
| 2007/0216222 | A1 * | 9/2007 | Miyazaki et al. | 303/155 |
| 2010/0270854 | A1 * | 10/2010 | Okano et al. | 303/3 |

* cited by examiner

*Primary Examiner* — John Q Nguyen
*Assistant Examiner* — Michael Kerrigan
(74) *Attorney, Agent, or Firm* — Lionel D. Anderson; Reising Ethington P.C.

(57) ABSTRACT

A vehicle brake system and method designed to maximize the contributions from a regenerative braking system, yet still provide adequate safety measures that address potential regenerative braking failure. According to one embodiment, the method determines both a requested deceleration from the driver and an actual deceleration experienced by the vehicle, and uses the difference between these two values to calculate a deceleration error that can be integrated over time and compared to an error threshold. If the integrated or accumulated deceleration error surpasses the error threshold, then the method may reduce or disable the regenerative braking system until it can confirm that it is operating properly.

19 Claims, 2 Drawing Sheets

VEHICLE BRAKE SYSTEM AND METHOD OF OPERATING THE SAME

FIELD

The present invention generally relates to a vehicle brake system and, more particularly, to a vehicle brake system that uses both regenerative and frictional braking.

BACKGROUND

Some vehicle brake systems use both regenerative and frictional braking to meet driver braking demand, and do so by partitioning the overall driver braking demand into a regenerative component and a frictional component. In order to guard against potential failures in the regenerative braking system, some vehicle brake systems place a limit or threshold on the regenerative component so that it does not exceed a level where the frictional braking system can, if needed, quickly intercede in the event that a regenerative braking failure were to occur. While this approach may address some of the concerns regarding potential regenerative braking failure, it can also limit the role of the regenerative braking system and thus reduce the overall fuel efficiency of the vehicle.

SUMMARY

According to one embodiment, there is provided a method of operating a vehicle brake system that includes both a frictional braking system and a regenerative braking system. The method may comprise the steps of: (a) gathering one or more vehicle operating conditions; (b) using the vehicle operating conditions to determine an actual deceleration and a requested deceleration; (c) using the actual deceleration and the requested deceleration to determine a deceleration error; (d) comparing the deceleration error to an error threshold; and (e) reducing regenerative braking by the regenerative braking system when the deceleration error exceeds the error threshold.

According to another embodiment, there is provided a vehicle brake system that comprises: one or more speed sensors, a brake sensor, a control module, a regenerative braking system, and a frictional braking system. The control module is configured to use speed and brake signals to compare the deceleration error to an error threshold and to replace regenerative braking by the regenerative braking system with frictional braking by the frictional braking system when the deceleration error exceeds the error threshold.

DRAWINGS

Figure 1:
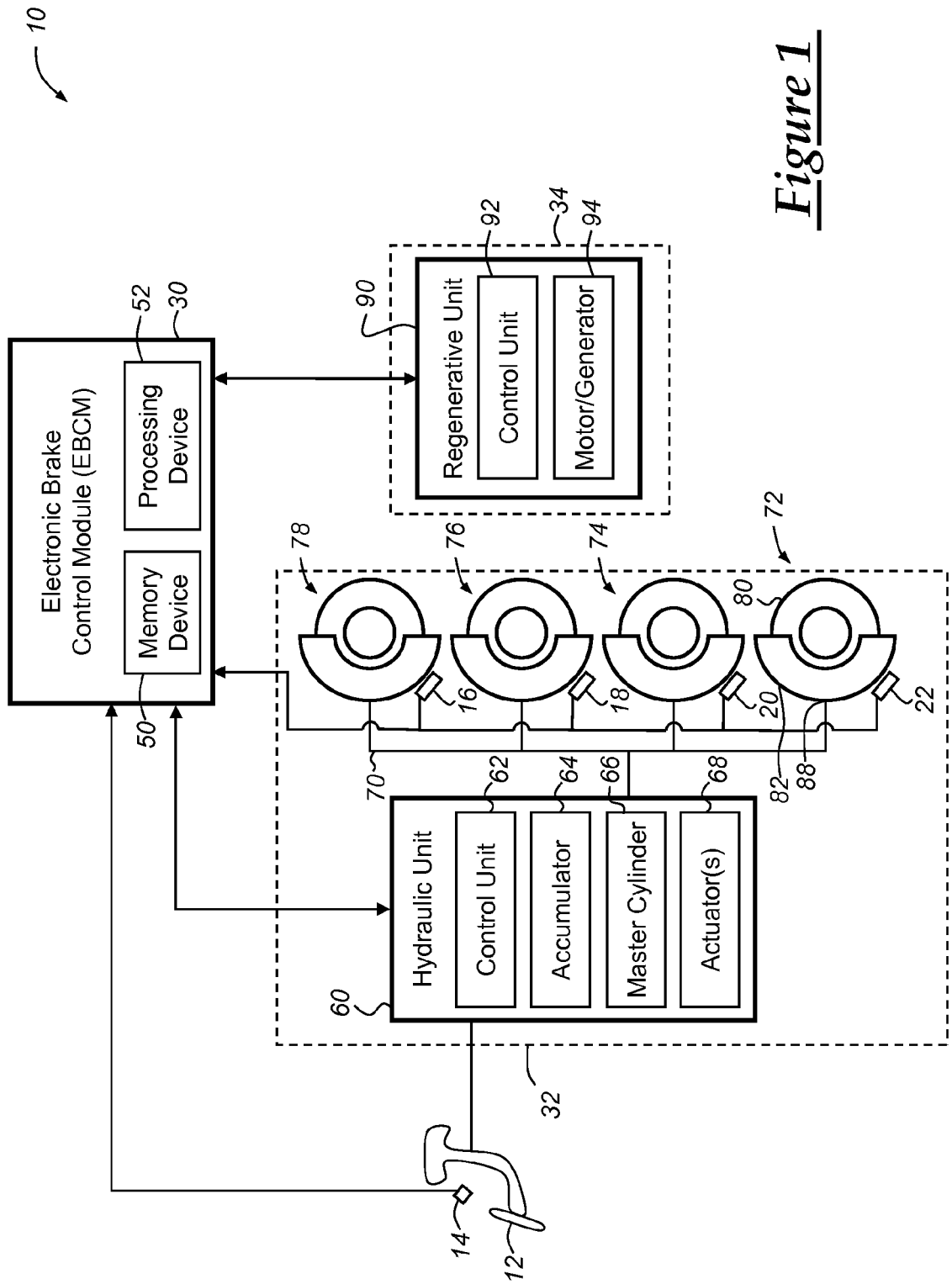
Figure 2:
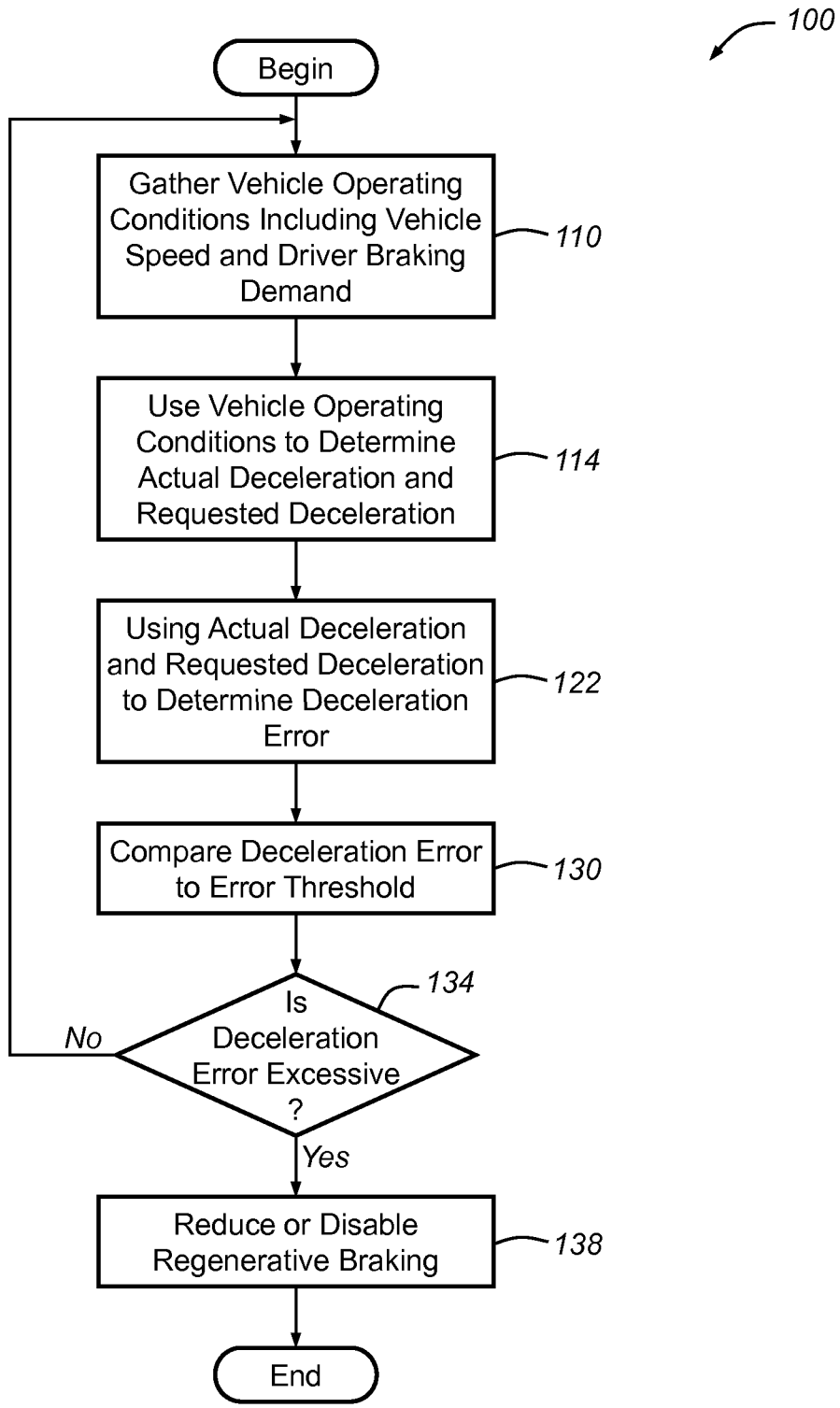

Preferred exemplary embodiments will hereinafter be described in conjunction with the appended drawings, wherein like designations denote like elements, and wherein:

FIG. 1 is a block diagram of an exemplary vehicle brake system that has both regenerative and frictional braking capabilities; and FIG. 2 is a flowchart of an exemplary method that may be used with a vehicle brake system, such as the one shown in FIG. 1.

DESCRIPTION

The vehicle brake system and method described herein are designed to maximize the contributions from a regenerative braking system, which generally increases the fuel economy of the vehicle, yet still provide adequate safety measures that address potential regenerative braking failure. According to one embodiment, the present method determines both a requested deceleration from the driver and an actual deceleration being experienced by the vehicle, and uses the difference of these two values to calculate a deceleration error that can be integrated over time and compared to an error threshold. If the integrated or accumulated deceleration error surpasses the error threshold, then the method may disable the regenerative braking system until it can confirm that it is operating properly. The present system and method can better distinguish between those situations that warrant disengaging regenerative braking and/or applying additional frictional braking and those situations that do not and, thus, reduce the number of instances where regenerative braking is unnecessarily disengaged.

Although the exemplary method is described herein in the context of a brake-by-wire system, such as an electro-hydraulic braking (EHB) system or an electro-mechanical braking (EMB) system, it should be appreciated that the method may also be used with any number of other braking systems and is not limited to the disclosed embodiment. For example, the present method may be used with other brake-by-wire and non-brake-by-wire systems, regenerative braking systems (e.g., those found in hybrid vehicles, battery electric vehicles, etc.), as well as other brake systems using other types of technologies (e.g., disc brakes, drum brakes or a combination thereof). These are only some of the possibilities, as the present method could be used with any vehicle brake system that uses both regenerative and frictional braking.

With reference to FIG. 1, there is shown a block diagram of an exemplary vehicle brake system 10 that has both frictional and regenerative braking capabilities and generally includes a brake pedal sensor 14, wheel speed sensors 16-22, an electronic module 30, a frictional braking system 32 and a regenerative braking system 34. Vehicle brake system 10 and the method described below can be used with a wide variety of vehicles, including a hybrid electric vehicle (HEV), a plug-in hybrid electric vehicle (PHEV), an extended range electric vehicle (EREV), or any other battery electric vehicle (BEV), for example, that utilizes a combination of frictional and regenerative braking to control the speed of the vehicle and to generate electrical energy. In such an arrangement, frictional braking torque may be generated in a conventional manner and counteracts the forward momentum of the vehicle through frictional resistance created by disc brakes, drum brakes, etc. Regenerative braking torque, on the other hand, may be generated by operating an electric motor in a reverse direction so that it acts as a generator, which in turn creates an electromagnetically-derived torque that acts against the forward momentum of the vehicle (this process also charges a battery that can later be used to propel/power the vehicle).

Brake pedal 12 is a pedal or lever that is operated by the driver and, according to this particular embodiment, is monitored by brake pedal sensor 14. In a brake-by-wire application, like the exemplary EHB system shown here, brake pedal 12 may be mechanically coupled to a brake pedal simulator or emulator by way of a spring mechanism or the like for conveying the expected mechanical feel to the driver. The brake pedal simulator may also include other mechanical and/or electronic components, including sensors, etc. Skilled artisans will appreciate that brake pedal 12 may also be mechanically coupled to a master cylinder, for example, which acts as a mechanical backup in the event that the brake-by-wire system experiences some type of malfunction.

Any number of different sensors, components, devices, modules, subsystems, systems, etc. may provide vehicle brake system 10 with information or input that could be used with the present method. These include, for example, the exemplary sensors shown in FIG. 1, as well as others that are known in the art but are not shown here. It should be appreciated that brake sensor 14, wheel speed sensors 16-22, as well as any other sensor located in and/or used by vehicle brake system 10 may be embodied in hardware, software, firmware or some combination thereof. These sensors may directly sense or evaluate the conditions for which they are provided, or they may indirectly evaluate such conditions based on information provided by other sensors, components, devices, modules, subsystems, systems, etc. Furthermore, these sensors may be directly coupled to electronic module 30, indirectly coupled via other electronic devices, coupled over a vehicle communications bus, network, etc., or coupled according to some other arrangement known in the art. In addition, these sensors may be integrated within a vehicle component, device, module, subsystem, system, etc. (e.g., sensors provided within an engine control module, an energy management system, etc.), they may be stand-alone components (as schematically shown in FIG. 1), or they may be provided according to some other arrangement. It is possible for any one of the sensor signals described below to be provided by an engine control module, a transmission control module, a brake control module, a traction control module, or some other component, device, module, subsystem, system, etc. instead of being directly provided by an actual sensor element. In some instances, multiple sensors might be employed to sense a single parameter (e.g., as a means for providing signal redundancy). These are only some of the possibilities, as any type of sensor or sensor arrangement known in the art could also be used.

Brake sensor 14 provides vehicle brake system 10 with a brake signal that is generally representative of the position, movement, exerted force, and/or state of the brake pedal. Thus, the brake signal is generally representative of driver braking demand or driver braking intent. Any number of different types of brake sensors may be used; these include non-contact-type sensors (e.g., optical sensors, electromagnetic sensors, etc.), contact-type sensors (e.g., potentiometers, contact switches, etc.), as well as those that measure the force that the driver exerts against the brake pedal, to name a few. In a brake-by-wire application, brake sensor 14 may be integrated with a brake pedal simulator or emulator that conveys the expected mechanical feel of the brake pedal to the driver, as well as provides a brake signal.

Vehicle speed sensors 16-22 provide vehicle brake system 10 with speed signals that are indicative of the rotational speed or velocity of the wheels, and hence the overall velocity of the vehicle. A variety of different speed sensors and sensing techniques may be used, including those that use rotational wheel speed, ground speed, accelerator pedal position, clutch pedal position, gear shifter selection, vehicle acceleration, engine speed, transmission output speed, and throttle valve position, to name a few. In one embodiment, individual wheel speed sensors 16-22 are coupled to each of the vehicle's four wheels and separately report the rotational velocity of the four wheels. Skilled artisans will appreciate that these sensors may operate according to optical, electromagnetic or other technologies, and that vehicle speed sensors 16-22 are not limited to any particular speed sensor type. In another embodiment, the speed sensors could be coupled to certain parts of the vehicle, such as an output shaft of the transmission or behind the speedometer, and produce speed signals from these measurements. It is also possible to derive or calculate speed signals from acceleration signals (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). It is possible for the speed signals to be provided to vehicle brake system 10 by some other module, subsystem, system, etc., like an engine control module (ECM).

Electronic module 30 may include any combination of electronic processing devices, memory devices, input/output (I/O) devices, and/or other known components, and may perform various control and/or communication related functions. In an exemplary embodiment, electronic module 30 includes an electronic memory device 50 and an electronic processing device 52. These modules may be embodied in hardware, software, or some combination thereof. Depending on the particular embodiment, electronic module 30 may be a single standalone unit or module, it may be incorporated or included within one or more other electronic modules or systems, it may be part of a larger network or system (e.g., an antilock braking system (ABS), a stability control system, a traction control system, a vehicle integrated control module (VICM), a motion and energy control (MEC) module, a hybrid control module, etc.), or it could embody a combination of these arrangements, to name a few possibilities. According to one embodiment, electronic module 30 is an electronic brake control module (EBCM) that controls a combination of frictional and regenerative braking operations. In such an arrangement it may control friction braking system 32 and/or regenerative braking system 34 via command signals sent to these systems. The present method is not limited to any particular embodiment.

Electronic memory device 50 may include any type of suitable electronic memory means and may store a variety of data, information and/or electronic instructions. This includes, for example, sensed vehicle conditions (e.g., those provided by sensors 14-22), look-up tables and other data structures, algorithms (e.g., electronic instructions used to implement the method described below), vehicle component characteristics and background information (e.g., operational settings, etc. for the different vehicle components), etc. The method described below—as well as any combination of electronic instructions and information needed to perform such an algorithm—may be stored or otherwise maintained in memory device 50.

Electronic processing device 52 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 52 is not limited to any one type of component or device. Electronic module 30 may be electronically connected to other vehicle devices, modules, systems, etc. via a suitable connection and can interact with them as required. These are, of course, only some of the possible arrangements, functions and capabilities of electronic module, as others are certainly possible.

Frictional braking system 32 is shown here as an electro-hydraulic braking (EHB) system, although it may be an electro-mechanical or other type of braking system, that generates frictional braking torque in a conventional manner. According to this exemplary embodiment, frictional braking system 32 includes a hydraulic unit 60 that is hydraulically coupled to brake units 72-78 which are located out at each of the vehicle wheels or corners. Although hydraulic unit 60 is schematically shown as having a separate hydraulic control unit 62, accumulator 64, master cylinder 66, and one or more actuator (s) 68 co-located with one another, it should be appreciated that any combination of these and/or other devices could instead be provided according to a number of other arrangement known in the art. For example, hydraulic control unit 62 could be integrated within EBCM 30 or some other module and be connected to actuator(s) 68 via electrical connections. Hydraulic control unit 62 may interact with EBCM 30 and act as an intermediary or driver for the various electromechanical actuators and devices in frictional braking system 32. In one example, hydraulic control unit 62 receives brake command signals from EBCM 30, processes those signals, and uses them to operate actuator(s) 68 so that the fluid pressure in hydraulic lines 70 is maintained at a desired pressure. In the case of a disc brake embodiment, the fluid pressure drives brake pistons in brake units 72-78 and controls their exerted brake force and brake torque. Skilled artisans will appreciate that hydraulic control unit 62 may perform any number of different tasks and execute a variety of different instructions, including those of the present method. Because the general structure and operation of accumulators, master cylinders, actuators and other components of hydraulic unit 60 are generally known, further description has been omitted.

Braking devices 72-78 may be part of any suitable vehicle brake system, including systems associated with disc brakes, drum brakes, electro-hydraulic braking, electro-mechanical braking, regenerative braking, brake-by-wire, etc. In an exemplary embodiment, braking devices 72-78 are each located out at a vehicle corner and each generally includes a rotor 80, caliper 82, brake piston 88, and brake pads (not shown) and may be part of an electro-hydraulic braking (EHB) system or some other type of system. As is appreciated by skilled artisans, a tire-wheel assembly (not shown) is attached to a hub with several lug nuts so that the tire, wheel, hub, and rotor 80 all co-rotate together. Brake caliper 82 straddles rotor 80 and carries brake piston 88 so that a compressive and frictional brake force can be applied by brake pads to opposing sides of the rotor during a braking event. The frictional brake forces slow the rotation of rotor 80 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disc brake systems and could be used with other braking systems and arrangements, including electro-mechanical brakes having electric calipers (e-calipers) and drum brake systems.

Regenerative braking system 34 uses electromagnetically-derived regenerative braking torque to counteract the forward rotation of the vehicle wheels and may include a regenerative unit 90 having a control unit 92 and a motor/generator 94. Regenerative control unit 92 may control or manage certain aspects of the regenerative braking operations, including aspects of the present method, and may interact with EBCM 30, hydraulic control unit 62 and/or some other component, device, module, system, etc. in the vehicle. Motor/generator 94 may include both a motor and a generator (a so-called "mogen") for generating both positive torque (acceleration) and negative torque (braking). Motor/generator 94 may be coupled to one or more drivetrain component(s), including output shafts, axles, vehicle wheels, etc., and may use the rotation of the drivetrain component(s) to slow down the vehicle and to generate electrical energy for charging a battery (not shown). While FIG. 1 schematically depicts motor/generator 94 as a single combined device, the motor and generator could be split and provided as two separate devices, or multiple motors/generators could be provided (e.g., separate motors/generators for the front and rear wheels, separate motors/generators for each wheel, separate motors/generators for different functions, etc.), to cite a few possibilities. Thus, the following description only refers to a single combined motor/generator unit 94, even though other regenerative braking system embodiments may be used instead. Motor/generator 94 may include AC motors (e.g., a three phase AC induction motor), DC motors, brushed or brushless motors, permanent magnet motors, etc., and may include a variety of components, like cooling features, sensors, control units and/or any other suitable components known in the art.

Again, the preceding description of exemplary vehicle brake system 10 and the drawing in FIG. 1 are only intended to illustrate one potential embodiment and the following method is not confined to use with only that system. Any number of other system arrangements, combinations and architectures, including those that differ significantly from the one shown in FIG. 1, may be used instead.

Turning now to FIG. 2, there is shown an exemplary method 100 for operating a vehicle brake system and, more particularly, for accurately determining when it is appropriate to disengage regenerative braking and/or applying additional frictional braking. Beginning with step 110, the method gathers various vehicle operating conditions or other pieces of information including, but certainly not limited to, vehicle speed and driver braking demand. In one embodiment, vehicle speed sensors 16-22 provide speed signals and brake sensor 14 provides brake signals (also known as driver braking intent) to electronic brake control module (EBCM) 30, which can use these signals to derive other information that is potentially useful to the present method. These signals may be gathered on a periodic basis (e.g., every 50 ms), may be gathered on an event-driven basis (e.g., brake sensor 14 provides brake signals only when the driver depresses brake pedal 12), or they may be gathered according to some other schedule or technique known in the art. After receiving these signals, the method may digitize, filter, convert, transform, and/or perform any number of other signal processing steps before evaluating the content of these signals. As mentioned above, signals such as these may be provided directly by sensor components or indirectly via other components, devices, modules, systems, etc. in the vehicle. It should be appreciated that vehicle speed and driver braking demand are only some of the potential vehicle operating conditions that could be gathered and used by the present method, as vehicle acceleration/deceleration, driver accelerating demand, stability readings, and/or other suitable vehicle operating conditions may be used in lieu of or in addition to the conditions cited here.

Next, step 114 uses the vehicle operating conditions gathered in the previous step to determine an actual deceleration and a requested deceleration. As its name suggests, the actual deceleration pertains to the actual deceleration being experienced by the vehicle and it may be directly measured, indirectly calculated from the vehicle speed (dv/dt), or provided by some other component, device, module, system, etc. in the vehicle, like an antilock brake system (ABS) or an engine control module (ECM). The actual deceleration may be compensated to take into account road grade, vehicle mass or other conditions so that the regenerative braking is not mistakenly disengaged. Step 114 also determines a requested deceleration, which generally represents the deceleration that is being requested or demanded from the driver through his or her engagement of brake pedal 12; this value corresponds to driver braking demand or driver braking intent. Depending on the particular system and method, any number of different techniques may be used for determining the requested deceleration, including the use of look-up tables or algorithms to convert brake pedal position to requested brake torque and to convert requested brake torque to requested deceleration. The actual deceleration and/or the requested deceleration may be provided in any number of different forms or units, including $-m/s^2$, as an example.

Step 122 then uses the actual deceleration and the requested deceleration to determine a deceleration error. In one embodiment, the method subtracts the requested deceleration value from the actual deceleration value in order to arrive at a deceleration error value. The deceleration error value may be positive (more deceleration than requested) or negative (less deceleration than requested), as this can potentially impact the manner in which the method subsequently addresses the accumulated deceleration error (e.g., different thresholds for positive error values versus negative error values). According to one possible approach, step 122 determines an instantaneous deceleration error for comparison to an instantaneous error threshold. If the method later determines that the instantaneous difference between actual and requested decelerations (i.e., the instantaneous deceleration error) exceeds an instantaneous error threshold, then the method may conclude that some type of regenerative braking failure is occurring and it can disable or reduce the regenerative braking accordingly. Such a process could be performed on a periodic basis (e.g., every 0.5 sec) and it could employ various filtering or processing steps that take into account changes due to noise, road imperfections (e.g., a pothole), to cite several possibilities.

According to another potential approach, step 122 determines an accumulated deceleration error over time and subsequently compares the accumulated deceleration error to some type of accumulated error threshold. One way to determine an accumulated deceleration error is to integrate the instantaneous deceleration error over some set or predetermined time period (an evaluation period) and, at the end of which, the result or accumulated deceleration error is compared to an accumulated error threshold. This process could be continuously repeated according to the set evaluation period. In another example, the instantaneous deceleration error is integrated over varying time periods that are dependent on one or more vehicle operating conditions, such as vehicle speed or driver braking demand. To illustrate, consider the situation where the vehicle is traveling at 25 km/h and the driver applies the brakes, resulting in an instantaneous deceleration error of $-0.05$ g, which is in line with a subtle or minor malfunction with the regenerative brakes. Step 122 may use the current vehicle speed of 25 km/h to select an evaluation period (i.e., the period of time over which the error is integrated), which could be 0.5 sec, for example. In this case, the method would integrate the error over 0.5 sec in order to determine an accumulated deceleration error, which could be subsequently compared to an appropriate threshold. Consider the same situation, only the vehicle is now traveling at 75 km/h; in this example, step 122 may select an evaluation period of 0.2 sec, for example, over which the instantaneous deceleration error of $-0.05$ g is integrated or otherwise monitored. When the vehicle is traveling faster, shorter evaluation periods may be used so that the method can more quickly intervene if a problem is detected. Factors other than vehicle speed, such as driver braking demand, may be used to select the evaluation period.

Next, step 130 compares the deceleration error (whether it be an instantaneous or accumulated deceleration error) to an error threshold. The error threshold may be either a set or predetermined threshold or it can vary depending on one or more vehicle operating conditions. To illustrate the use of a predetermined threshold, consider the example from above where the vehicle is traveling at 25 km/h and the instantaneous deceleration error of $-0.05$ g (m/s$^2$) is integrated over a period of 0.5 sec, resulting in an accumulated deceleration error of $-0.025$ gsec. Step 130 may compare the accumulated deceleration error of $-0.025$ gsec to a predetermined or set threshold of say $-0.05$ gsec; in which case, the method would conclude that the error does not exceed the threshold so no intervening action is needed. This comparison could be carried out using the absolute values of the quantities involved, as the comparison is interested in whether the magnitude of the error exceeds that of the threshold.

To illustrate a varying or dynamic threshold, consider the same set of circumstances except that the method uses vehicle speed and/or other vehicle operating conditions to first select a threshold before performing the comparison in step 130. For example, the method may employ a one-dimensional look-up table that uses the current vehicle speed of 25 km/h as an input and provides a corresponding error threshold of $-0.06$ gsec as an output. If the vehicle was traveling at 75 km/h, then a corresponding error threshold of $-0.04$ gsec or some other value may be used. Generally speaking, the faster the vehicle is traveling the lower the threshold, as the method may want to intervene sooner at higher speeds. Or the method may use a two-dimensional look-up table that uses both vehicle speed and the current requested deceleration as inputs and generates a corresponding error threshold as an output. A deceleration error of $-0.2$ gsec is usually more noticeable and alarming to a driver who is only requesting 0.2 g of deceleration than one who is requesting 0.8 g; thus, the lower the current requested deceleration (i.e., the lower the driver braking demand), the lower the error threshold. Skilled artisans will appreciate that a variety of look-up tables and other data structures, as well as different inputs and factors may be used to determine varying error thresholds. Error thresholds may include a single value or a range of values, and separate look-up tables may be provided for positive deceleration errors (where too much actual braking is being provided) versus negative deceleration errors (where not enough actual braking is being provided). Other examples are certainly possible, as those above are only provided for purposes of illustration.

As explained above, it is possible for the method to use one or more vehicle operating conditions to dynamically select the evaluation period over which the deceleration error is accumulated and/or the error threshold against which the deceleration error is compared. This provides the method with the ability to make a customized or tailored evaluation of the deceleration error for a particular set of vehicle operating conditions and differs from conventional methods that simply limit regenerative braking to a certain level, independent of deceleration error. Once the deceleration error and the corresponding error threshold are determined and compared, the method generally knows if the vehicle is experiencing too much deceleration (positive deceleration error), not enough deceleration (negative deceleration error), and whether or not such deceleration errors exceed corresponding thresholds which indicate if they are excessive. Some vehicle testing has shown that a driver's perception of the severity of a gain or loss in deceleration can be dependent on a number of factors, including: the magnitude of the gain or loss, the time period over which the gain or loss occurs, the vehicle speed at which the gain or loss occurs, and the relative percentage of the gain or loss compared to the overall driver braking demand. In an exemplary embodiment, the present method takes all of these factors into account when determining whether or not the regenerative braking should be cancelled or reduced.

If step 134 determines that the deceleration error is excessive, then the method proceeds to step 138 for one or more remedial actions; if, on the other hand, step 134 concludes that the deceleration error is not excessive, then the method loops back to the beginning for continued monitoring. As mentioned above, the comparison of the deceleration error to the error threshold may be carried out on an absolute value basis so that positive and negative signs do not inadvertently impact the comparison. The phrase "when the deceleration error exceeds the error threshold," as used herein, generally refers to situations when the absolute value or magnitude of the deceleration error exceeds that of the error threshold (e.g., a deceleration error of −0.053 g·sec "exceeds" an error threshold of −0.04 gsec, even though it is a lesser number). A conclusion of non-excessive error could be the result of: there being no appreciable deceleration error, a positive deceleration error that is less than its corresponding threshold, a negative deceleration error that is less than its corresponding threshold, or some other set of circumstances.

If the method determines that the deceleration error is excessive, then step 138 reduces the regenerative component of the overall driver braking demand and may do so in a variety of ways. In one embodiment, step 138 simply replaces the regenerative component with a frictional component so that frictional brake system 32 eventually takes over braking the vehicle. One potential reason for switching the braking load from regenerative braking system 34 to frictional braking system 32 is that traditional frictional braking systems, such as those employing disc and/or drum brakes, are sometimes more reliable and robust than their regenerative braking counterparts which can experience otherwise undetected errors. Some examples of potentially undetected regenerative braking failures include hardware failures (e.g., clutch slippage in regenerative braking system), software failures, calibration failures, etc. If step 138 does replace the regenerative braking component with a frictional component, this transition may be carried out all at once or it may be blended or smoothed over time so that the regenerative component is gradually reduced to zero in a manner that is not noticeable to the driver. In a different embodiment, step 138 reduces the regenerative component down to a certain level, but does not completely replace it with a frictional component. The exact division or magnitude of regenerative and frictional braking components can depend on a number of factors. Following step 138, the method can either end, as illustrated in FIG. 2, or it can loop back to the beginning for continued processing.

According to an optional feature, when it is concluded that the deceleration error is excessive and that the regenerative braking component should be reduced, the method may temporarily disable the regenerative braking system 34. For example, the method may disable regenerative braking for the remainder of the braking event in which the discrepancy or error was detected. When the driver has completed the current cycle of applying and releasing the brake pedal (i.e., the current braking event) or when the vehicle speed reaches zero, for example, then the method may reinstate the regenerative braking system 34 and begin again, as explained above. A figure of merit of the occurrence of such events may be maintained and then used for providing diagnostic trouble codes (DTC).

Another optional feature involves the use of overlapping evaluation periods or windows. To illustrate, consider the example above where the method is integrating a deceleration error over an evaluation period that extends from 0.0 sec to 0.5 sec and then compares the accumulated deceleration error to an accumulated error threshold. A second overlapping evaluation period may extend from 0.25 sec to 0.75 sec; a third overlapping evaluation period may extend from 0.5 sec to 1.0 sec; a fourth overlapping evaluation period may extend from 0.75 sec to 1.25 sec, and so on. The method may reduce regenerative braking at step 138 if an excessive deceleration error is detected during any single evaluation period or window, or the method may only reduce regenerative braking at step 138 if an excessive deceleration error is detected during two, three, four, etc. successive evaluation periods in a row, or the method may employ a one-out-of-two, a two-out-of-three, a three-out-of-four, etc. evaluation period requirement before reducing regenerative braking. These are only some of the potential strategies and techniques that may be used by the present method, as others are certainly possible.

If, on the other hand, step 134 determines that the deceleration error is not excessive (e.g., if the error does not exceed its corresponding threshold), then the method may loop back to the beginning without altering the current balance of regenerative and frictional braking.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle brake system that includes both a frictional braking system and a regenerative braking system, comprising the steps of:
   (a) gathering one or more vehicle operating conditions;
   (b) using the vehicle operating conditions to determine an actual deceleration and a requested deceleration;
   (c) using the actual deceleration and the requested deceleration to determine a deceleration error;
   (d) comparing the deceleration error to an error threshold; and
   (e) reducing regenerative braking by the regenerative braking system when the deceleration error exceeds the error threshold, wherein at least one of the steps (a)-(e) is performed by an electronic module.

2. The method of claim 1, wherein step (a) further comprises gathering vehicle operating conditions that include a vehicle speed and a driver braking demand.

3. The method of claim 2, wherein step (b) further comprises using the vehicle speed to determine the actual deceleration and using the driver braking demand to determine the requested deceleration.

4. The method of claim 1, wherein step (c) further comprises using the actual deceleration and the requested deceleration to determine an instantaneous deceleration error, and step (d) further comprises comparing the instantaneous deceleration error to an instantaneous error threshold.

5. The method of claim 1, wherein step (c) further comprises using the actual deceleration and the requested deceleration to determine an accumulated deceleration error, and step (d) further comprises comparing the accumulated deceleration error to an accumulated error threshold.

6. The method of claim 5, wherein step (c) further comprises using the actual deceleration and the requested deceleration to determine an instantaneous deceleration error, and integrating the instantaneous deceleration error over time in order to determine the accumulated deceleration error.

7. The method of claim 6, wherein the instantaneous deceleration error is integrated over a predetermined evaluation period.

8. The method of claim 6, wherein the instantaneous deceleration error is integrated over a varying evaluation period that is at least partially dependent on vehicle speed or driver braking demand.

9. The method of claim 8, wherein a faster vehicle speed results in a shorter evaluation period.

10. The method of claim 1, wherein step (d) further comprises comparing the deceleration error to a predetermined error threshold.

11. The method of claim 1, wherein step (d) further comprises comparing the deceleration error to a varying error threshold that is at least partially dependent on vehicle speed or driver braking demand.

12. The method of claim 11, wherein a faster vehicle speed results in a lower varying error threshold.

13. The method of claim 11, wherein a lower driver braking demand results in a lower varying error threshold.

14. The method of claim 11, wherein a first look-up table is used for positive deceleration errors where the actual deceleration exceeds the requested deceleration, and a second look-up table is used for negative deceleration errors where the requested deceleration exceeds the actual deceleration.

15. The method of claim 1, wherein step (c) further comprises determining a plurality of deceleration errors over a plurality of overlapping evaluation periods, and step (d) further comprises comparing the plurality of deceleration errors to one or more error thresholds.

16. The method of claim 1, wherein step (e) further comprises replacing regenerative braking by the regenerative braking system with frictional braking by the frictional braking system so that the regenerative component is reduced to zero.

17. The method of claim 1, wherein step (e) further comprises replacing regenerative braking by the regenerative braking system with frictional braking by the frictional braking system so that the regenerative component is reduced to a certain level but is not reduced to zero.

18. The method of claim 1, wherein step (e) further comprises temporarily disabling regenerative braking by the regenerative braking system and subsequently reinstating regenerative braking.

19. A vehicle brake system, comprising:
one or more speed sensors providing speed signals corresponding to vehicle speed;
a brake sensor providing a brake signal corresponding to driver baking demand;
a control module being coupled to the one or more speed sensors and receiving the speed signals and being coupled to the brake sensor and receiving the brake signal;
a regenerative braking system being coupled to the control module; and
a frictional braking system being coupled to the control module, wherein the control module is configured to: use the speed signals to determine an actual deceleration, use the brake signal to determine a requested deceleration, calculate at least one of an instantaneous deceleration error value or an accumulated deceleration error value by subtracting the requested deceleration from the actual deceleration, and compare the at least one deceleration error value to an error threshold and to replace regenerative braking by the regenerative braking system with frictional braking by the frictional braking system when the at least one deceleration error value exceeds the error threshold.

* * * * *